(12) United States Patent
      Goto

(10) Patent No.:     US 12,621,183 B2
(45) Date of Patent:        May 5, 2026

(54) METHOD FOR DETERMINING LAYOUT OF ECU

(71) Applicant: TOYOTA JIDOSHA KABUSHIKI KAISHA, Toyota (JP)

(72) Inventor: Keita Goto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 334 days.

(21) Appl. No.: 18/491,062

(22) Filed: Oct. 20, 2023

(65) Prior Publication Data

US 2024/0214241 A1      Jun. 27, 2024

(30) Foreign Application Priority Data

Dec. 21, 2022    (JP) ................................. 2022-203900

(51) Int. Cl.
      *H04L 12/40*            (2006.01)
(52) U.S. Cl.
      CPC .................. *H04L 12/40006* (2013.01); *H04L 2012/40273* (2013.01)
(58) Field of Classification Search
      CPC .... G05B 9/02; H04L 12/40006; B60W 40/08; G08B 21/24; G06K 9/00926; B60R 25/23
      See application file for complete search history.

(56)                References Cited

U.S. PATENT DOCUMENTS

2020/0053113 A1      2/2020  Sasaki et al.
2021/0229517 A1*    7/2021  Ishibashi .............. B62D 5/0409
2022/0038903 A1*    2/2022  Fu ....................... H04W 12/106
2023/0058007 A1*    2/2023  Somanath ....... B60W 60/00253

FOREIGN PATENT DOCUMENTS

JP          2019-129527 A      8/2019

* cited by examiner

*Primary Examiner* — Iqbal Zaidi

(74) *Attorney, Agent, or Firm* — SoraIP, Inc.

(57)                ABSTRACT

ECU is laid out based on the number of wires and the diameter of the wires used in the in-vehicle networking. A dividing form of the electric wire for realizing the layout of the respective ECU is determined, and a position of the connector arranged at the dividing position and a number of the connectors are determined. It is determined whether or not an ECU having a lower access difficulty exists, and when the bus to which the security risk ECU is connected is a bus to which an ECU having a lower security level is connected, the security risk ECU is laid out on another bus to determine a construction in-vehicle network.

4 Claims, 3 Drawing Sheets

FIG. 2

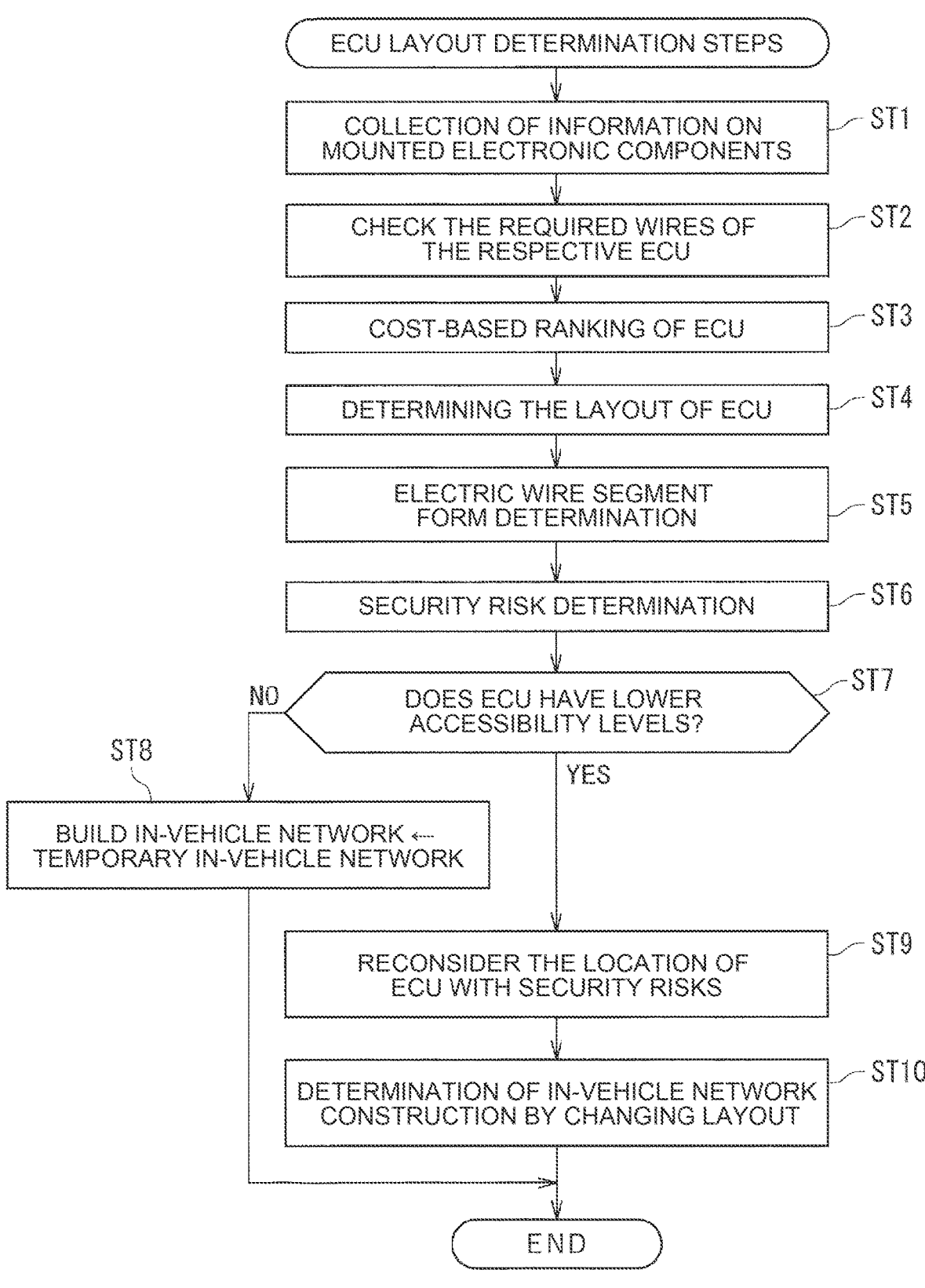

ECU LAYOUT DETERMINATION STEPS

COLLECTION OF INFORMATION ON MOUNTED ELECTRONIC COMPONENTS — ST1

CHECK THE REQUIRED WIRES OF THE RESPECTIVE ECU — ST2

COST-BASED RANKING OF ECU — ST3

DETERMINING THE LAYOUT OF ECU — ST4

ELECTRIC WIRE SEGMENT FORM DETERMINATION — ST5

SECURITY RISK DETERMINATION — ST6

DOES ECU HAVE LOWER ACCESSIBILITY LEVELS? — ST7

NO

ST8

BUILD IN-VEHICLE NETWORK ← TEMPORARY IN-VEHICLE NETWORK

YES

RECONSIDER THE LOCATION OF ECU WITH SECURITY RISKS — ST9

DETERMINATION OF IN-VEHICLE NETWORK CONSTRUCTION BY CHANGING LAYOUT — ST10

END

METHOD FOR DETERMINING LAYOUT OF ECU

CROSS-REFERENCE TO RELATED APPLICATION

This application claims priority to Japanese Patent Application No. 2022-203900 filed on Dec. 21, 2022, incorporated herein by reference in its entirety.

BACKGROUND

1. Technical Field

The present disclosure relates to a method for determining a layout of an electronic control unit (ECU). In particular, the present disclosure relates to a measure for suppressing an adverse effect caused by unauthorized access to an in-vehicle network.

2. Description of Related Art

In recent years, as an in-vehicle network that performs communication between various electronic control units (ECUs) mounted on a vehicle, a network in which a communication protocol such as a controller area network (CAN) is utilized has become popular in view of an increase in the number of the ECUs mounted as the performance of the vehicle increases.

There is a concern that a malicious third party illegally accesses such an in-vehicle network, and stops a vehicle anti-theft function (so-called immobility function) and causes theft damage of the vehicle associated therewith.

Japanese Unexamined Patent Application Publication No. 2019-129527 (JP 2019-129527 A) discloses a technique for detecting the unauthorized access. Specifically, it is disclosed that an abnormality analysis result that is a result of analyzing an abnormality of an in-vehicle network of each of a first vehicle and a second vehicle on which the in-vehicle network is mounted is acquired, and, for each of the first vehicle and the second vehicle, among ECUs connected to the in-vehicle network, a primary ECU having a higher degree of association with abnormality data indicated by the abnormality analysis result is specified, a plurality of ECUs connected to a bus to which the primary ECU is connected is specified as a secondary ECU group, an ECU that satisfies a predetermined condition included in both of the secondary ECU group specified for the first vehicle and the secondary ECU group specified for the second vehicle is specified as an abnormality related ECU, and information indicating the abnormality related ECU is output.

SUMMARY

However, the technique disclosed in JP 2019-129527 A is a technique for performing analysis when unauthorized access is performed on a system that ensures security as a system architecture in terms of software. For this reason, it is impossible to detect a situation in which it cannot be determined that data is abnormal (for example, transmission of communication data by spoofing an ECU mounted on a vehicle or an attack caused by a false tool for a service or general professional), and there is room for improvement in security. In particular, in view of car sharing by a vehicle of mobility as a service (Maas) using techniques such as Connected, Autonomous, Shared&Services, Electric (CASE), which is expected to become widespread in the future, there is a concern that not only the above-mentioned vehicle is stolen, but also payment information of the car sharing is altered, and there is a concern that the damage caused by the unauthorized access may affect a plurality of users, which may hinder the practicality of the car sharing. For this reason, there is a demand for a robust security measure that has not been achieved in the past.

In view of the above, the inventors of the present disclosure have come to the present disclosure based on the foregoing knowledge of constructing a layout of an ECU in which the robust security measure can be taken.

The present disclosure has been made in view such circumstances, and an object of the present disclosure is to provide a method for determining a layout of an ECU capable of suppressing the adverse effects caused by the unauthorized access to an in-vehicle network.

The solution of the present disclosure for achieving the above object is on the premise of a method for determining a layout of an ECU on an in-vehicle network in which a plurality of the ECUs is connected to each of a plurality of buses. The method includes a step pf determining an arrangement position of each of the ECUs in view of at least a required amount of an electric wire, when each of the ECUs is disposed;

a step of determining an electric wire dividing shape by a connector for connecting the electric wire to each of the ECUs according to the arrangement position of each of the ECU that has been determined;

a step of extracting an ECU having a low access difficulty level from an outside as an ECU having a security risk, from among the ECUs; and a step of changing a layout of the extracted ECU having a security risk to another bus when the ECU having a security risk is disposed on the same bus as an ECU of which a security level is not high, in the arrangement position of each of the ECUs that has been determined in each step.

The term "an ECU having a low access difficulty level from an outside" herein refers to an ECU having a low access difficulty level from the outside physically, and is defined in accordance with, for example, an arrangement position or the like, assuming that the working time required for accessing from the outside is less than a predetermined time or that the number of the working steps required for accessing from the outside (the steps for removing a part or the like) is less than a predetermined number.

According to the above specification, by changing the layout of the ECU having a security risk to another bus, it is possible to suppress the unauthorized access to the ECU of which the security level is not high from the connector connected to this ECU. In other words, it is possible to construct an in-vehicle network capable of physically suppressing the unauthorized access (unauthorized access to the ECU of which the security level is not high), and it is possible to take the robust security measure for "spoofing" and the like.

Further, the ECU of which the security level is not high is an ECU in which a security software-based measure is not taken.

In the ECU in which the security software-based measure is taken, even when the bus to which the ECU is connected is illegally accessed, a problem may not occur. However, when the bus to which the ECU in which the security software-based measure is not taken is connected is illegally accessed, there is a concern of damage such as theft of the vehicle. Therefore, in the present solution, in order to suppress the adverse effect caused by the unauthorized access to the bus to which the ECU in which the security software-based measure is not taken is connected, the layout of the ECU having a security risk is changed to another bus when the ECU having a security risk is disposed on the same bus as the ECU of which the security level is not high.

Further, the ECU having a security risk is a lamp ECU, and the ECU of which the security level is not high is a body ECU and a matching ECU.

Since the lamp ECU is disposed near the front end of the vehicle, there is a possibility that a connector connected to the lamp ECU is relatively easily illegally accessed. Therefore, in the present solution, when the lamp ECU is disposed on the same bus as the ECU of which the security level is not high (the body ECU and the matching ECU), the layout of the lamp ECU is changed to another bus, thereby suppressing the unauthorized access to the matching ECU due to a malicious third party external device spoofing the body ECU.

By changing the layout of the ECU having a security risk to another bus, it is possible to suppress the unauthorized access to the ECU of which the security level is not high from the connector connected to this ECU. Accordingly, it is possible to construct the layout of the ECU in which the robust security measure can be taken.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a flow chart illustrating a process of determining an ECU layout.

DETAILED DESCRIPTION OF EMBODIMENTS

Hereinafter, an embodiment of the present disclosure will be described with reference to the drawings. In the present embodiment, ECU layout-determining process according to the present disclosure is applied to a vehicle-mounted network using a CAN.

Schematic Configuration of the In-Vehicle Network

Prior to describing the method of determining ECU layout according to the present embodiment, an in-vehicle network to which the method of determining ECU layout is applied will be described.

As described above, the present disclosure is characterized in that, when a ECU having a lower degree of difficulty in accessing from the outside (ECU having a security risk referred to in the present disclosure) is arranged on the same bus as an ECU where the security level is not high, ECU having the security risk is layout-changed (layout-changed) on another bus. Hereinafter, the in-vehicle network before the layout change of ECU is referred to as a temporary in-vehicle network, and the in-vehicle network after the layout change of ECU is referred to as a construction in-vehicle network.

Figure 1:
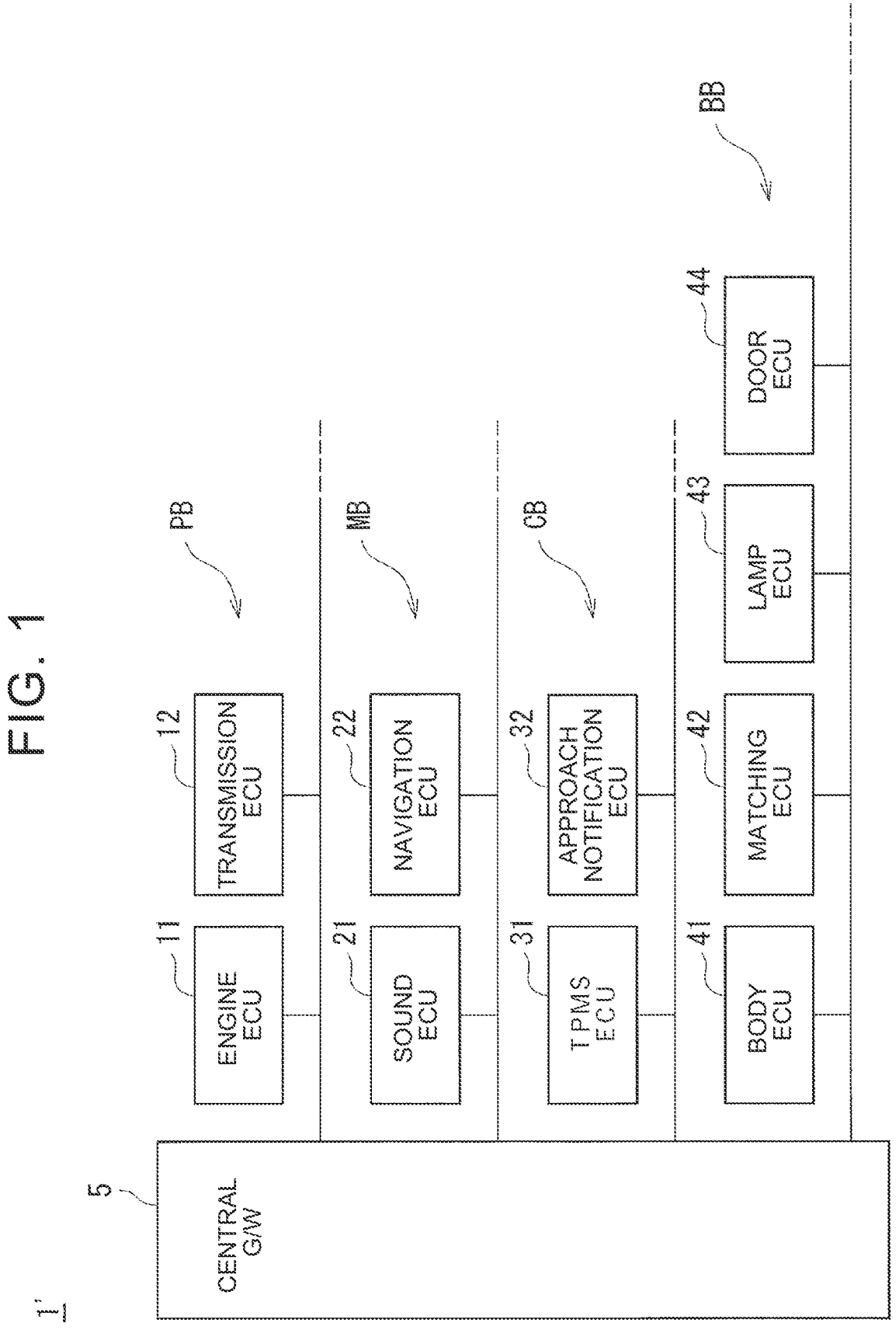
FIG. 1 is a diagram illustrating a schematic configuration of a temporary vehicle-mounted network prior to a ECU layout-change in an embodiment.

First, a schematic configuration of the entire in-vehicle network will be described by taking a temporary in-vehicle network as an example. FIG. 1 is a diagram illustrating a schematic configuration of a temporary vehicle-mounted network (hereinafter, sometimes simply referred to as an in-vehicle network) 1'. As shown in FIG. 1, the in-vehicle network 1' is networked by connecting a plurality of ECUs 11 to 44 for buses such as a power train bus PB, a media bus MB, a chassis bus CB, and a body bus BB. Various power supply systems are applied to the busses PB, MB, CB, BB according to the application.

The power train bus PB is a system in which a power train system ECU group mainly related to power control is connected, such as an engine ECU 11 that controls an engine, a transmission ECU 12 that controls a transmission, and the like. In addition, in some cases power supply ECU, hybrid-system ECU, motor ECU, etc. are connected. The power train bus PB is operated by an ignition power supply (IG system) that is supplied with power when the key-switch is in IG or start position.

The media bus MB is a system in which a group of media-based ECU mainly related to information is connected, such as an audio ECU 21 that controls audio equipment, a navigation ECU 22 that controls a car navigation system, and the like. In addition, a video ECU, a telephone ECU, or the like may be connected. The media bus MB is operated by an accessory power supply (ACC system) that is supplied with power when the key-switch is in ACC or IG position.

The chassis bus CB is a system in which a chassis system ECU group mainly related to control for traveling is connected, such as a Tire Pressure Monitoring System (TPMS) ECU 31 for monitoring the air pressure of a tire, an approach notification ECU 32 for reporting a relative approach to an obstacle around the vehicle, and the like. In addition, an airbag ECU or the like may be connected. In the chassis bus CB, the respective devices are operated by the ignition power supply (IG system).

The body bus BB is a system in which a body system ECU group mainly relating to the control of interior components is connected, such as a body ECU 41 capable of controlling the respective devices of the body system and transmitting an immobilization release command signal to a matching ECU (for example, transmitting an immobilization release command signal as a user carrying a smart key approaches), a matching ECU 42 for releasing the operation of the immobilizer in response to receiving an immobilization release command signal from the body ECU 41, a lamp ECU 43 for controlling the lighting of the headlamp, a door ECU 44 for locking and unlocking the door, and the like. In addition, a meter ECU or the like may be connected. The body bus BB is operated by a battery power supply (system B), which is supplied with power at all times regardless of the position of the key switch.

Each bus PB, MB, CB, BB shares the same data for each bus PB, MB, CB, BB. These busses PB, MB, CB, BB are connected to the central gateway 5.

The central gateway 5 includes a microcomputer including well-known CPU, ROM, RAM, input/output interfaces (not shown). In addition, the central gateway 5 has a relay function of information and a monitoring function of information for mutual communication between a plurality of ECUs 11 to 44, and is configured to select only information required for each bus PB, MB, CB, BB and individually transmit information to each bus PB, MB, CB, BB.

Method for Determining Layout of ECU

Next, methods for determining ECU layouts, which are features of the present embodiment, will be described. Before describing specific methods for determining ECU layouts, an outline of the technical idea of the present disclosure will be described.

For example, in an in-vehicle network 1' using a CAN as a communication protocol, the arrangement position of each ECU 11 to 44 is determined so that the length of a wire harness (electric wire) such as a power supply line or a communication line can be shortened as much as possible for the purpose of cost reduction or the like, and the division form by the electric wire is determined so that the number of connectors for connecting each ECU 11 to 44 to the electric wire can be minimized as much as possible. In this way, the in-vehicle network 1' is constructed.

In addition, in order to avoid an adverse effect on the driving of the vehicle due to unauthorized access by a malicious third party (an adverse effect on functions such as running, turning, and stopping of the vehicle), for example, a security software measure (a security measure such as a firewall) is taken in the power train bus PB. For this reason, even if the powertrain bus PB is illegally accessed, it is unlikely to occur.

On the other hand, in a case where an unauthorized access is made to a bus of a system for which security measures have not been taken, there is a possibility that the operation of the immobilizer is released (the anti-theft function of the vehicle is stopped) due to the aforementioned "spoofing" or the like, or that the settlement information is tampered with in the case of car sharing, resulting in damage caused by unauthorized access to a plurality of users. For example, since the lamp ECU 43 in the temporary vehicle-mounted network 1' is disposed near the front end of the vehicle, there is a possibility that the connector connected to the lamp ECU 43 is relatively easily illegally accessed (the degree of difficulty in accessing from the outside is lower than in other ECU). If the device that has been spoofed as a body ECU is illegally accessed by the connector (the connector connected to the lamp ECU 43), the matching ECU 42 may release the operation of the immobilizer, thereby causing theft of the vehicles. That is, although the body ECU 41 and the matching ECU 42 are generally housed in a console or the like, although the degree of difficulty in accessing from the outside is relatively high, there is a possibility that the matching ECU 42 is illegally accessed via the connector connected to the lamp ECU 43 because the degree of difficulty for the lamp ECU 43 on the same bus (body bus BB) in accessing from the outside is low.

In view of this, the present embodiment determines whether or not an ECU (e.g., a lamp ECU 43) in a position where unauthorized access is relatively easy is required to be subjected to a layout change from the viewpoint of avoiding unauthorized access, and performs a layout change as needed to provide a robust security measure. Hereinafter, methods for determining ECU layouts will be described in detail.

FIG. 2 is a flowchart illustrating a process of determining an ECU layout according to the present embodiment. In this flow chart, ST1 to ST5 determine the basic layout of the various ECUs 11 to 44 and the division form of the electric wires connected to the respective ECUs 11 to 44. That is, it is a step of constructing the temporary vehicle-mounted network 1'. Then, ST6 to ST10 are steps of determining an ECU layout which is a characteristic part in the present embodiment (determining a change from the layout shown in FIG. 1). In other words, ECU layout is changed as needed to construct the construction in-vehicle network 1 (see FIG. 3).

First, in ST1, the electronic components (on-board electronic components) existing on the on-board network 1' or required when the on-board network 1' is constructed at the designing stage are collected. Specifically, information on the type and number of electronic components is collected. Here, the electronic components include not only the respective ECUs 11 to 44 but also various electronic devices and sensors.

In ST2, considering the cost of each component of the in-vehicle network 1', the number of electric wires (wire harnesses such as power supply lines and communication lines) and the diameter of the electric wires required for mounting each ECU 11 to 44 are checked.

ST3 ranks ECU 11 to 44 by cost. Generally, ECU responsible for complex control and ECU responsible for control requiring high-safety are expensive, and ECU responsible for simple control is low-cost. For example, the engine ECU 11, the transmission ECU 12, and the like not only have a high cost of ECU themselves, but also have a high cost in mounting because the number of connected electric wires is large and the diameter of the electric wires is large because there is a large amount of data to be transmitted and received. On the other hand, for example, a lamp ECU 43, a door ECU 44, or the like is not only low in cost of ECU themselves, but also has a low cost in mounting because the number of connected electric wires is small and the diameter of the electric wires is small because the quantity of transmitted and received is relatively small.

In ST4, the optimum layout is determined based on the above-described cost (cost due to the number of electric wires and the diameter of the electric wire). Here, the optimum layout is a layout for realizing cost-reduction of electric wires required for mounting the respective ECUs 11 to 44. For example, considering that a wire having a small diameter has a low cost per unit length and a wire having a large diameter has a high cost per unit length, the respective ECUs 11 to 44 are laid out so as to preferentially shorten the length of the wire having a large diameter. Specifically, in ECU where the number of wires to be connected is large and the diameter of the wires is large (ECU where the cost for mounting is high), the layout shall be made as close as possible to the power supply (battery), and in the other ECU (ECU where the cost for mounting is low), the layout shall not necessarily be made close to the power supply. This ST4 corresponds to the "steps of determining the arrangement position of each ECU in view of at least the required electric dose" in arranging each ECU.

In ST5, a dividing form of the electric wire for realizing the layout of the respective ECUs 11 to 44 determined by ST4 is determined, and a position of the connector arranged at the dividing position and a number of the connectors are determined. This ST5 corresponds to the "steps of determining a wire dividing form by a connector for connecting an electric wire to each ECU in accordance with the determined arrangement position of each ECU".

The above-described temporary in-vehicle network 1' is determined by the above-described ST1 to ST5.

After the provisional in-vehicle network 1' is determined in this way, ST6 determines the security-risk in the provisional in-vehicle network 1'. Specifically, it is determined whether or not there is a ECU that is less difficult to access from the outside. Here, a lamp ECU 43 having a low accessibility due to being disposed near the front end portion of the vehicle corresponds to this.

In ST7, it is determined whether or not there is an ECU having a lower accessibility level. That is, it is determined whether or not an ECU with a security risk (an ECU with a security risk in the present disclosure) exists. This ST7 corresponds to the "steps of extracting, as security-risky ECU, an ECU having a lower accessibility level from the outside among the respective ECU".

When ECU with security risk does not exist and ST7 determines NO (for example, when all ECU are relatively difficult to access from the outside), the process shifts to ST8, and it is determined that there is no ECU to be laid out, and the temporary in-vehicle network 1' is determined as it is as the construction in-vehicle network 1.

On the other hand, if there is an ECU with a security risk, and ST7 determines YES, ST9 is moved to reconsider the connecting position of ECU with a security risk. Specifically, ECU with security risk is extracted, and the bus to which ECU with security risk is connected is checked, and it is checked whether or not the bus is a bus of a system (the same bus as an ECU where the security level is not high) in which security measures are not taken. Specifically, as described above, since the lamp ECU 43 whose access difficulty level is low is connected to the body bus BB in which no security measures are taken, the lamp ECU 43 is extracted as a corresponding ECU (security risk ECU arranged on the same bus as ECU in which the security level is not high), and the connecting position of the lamp ECU 43 is reconsidered.

Figure 3:
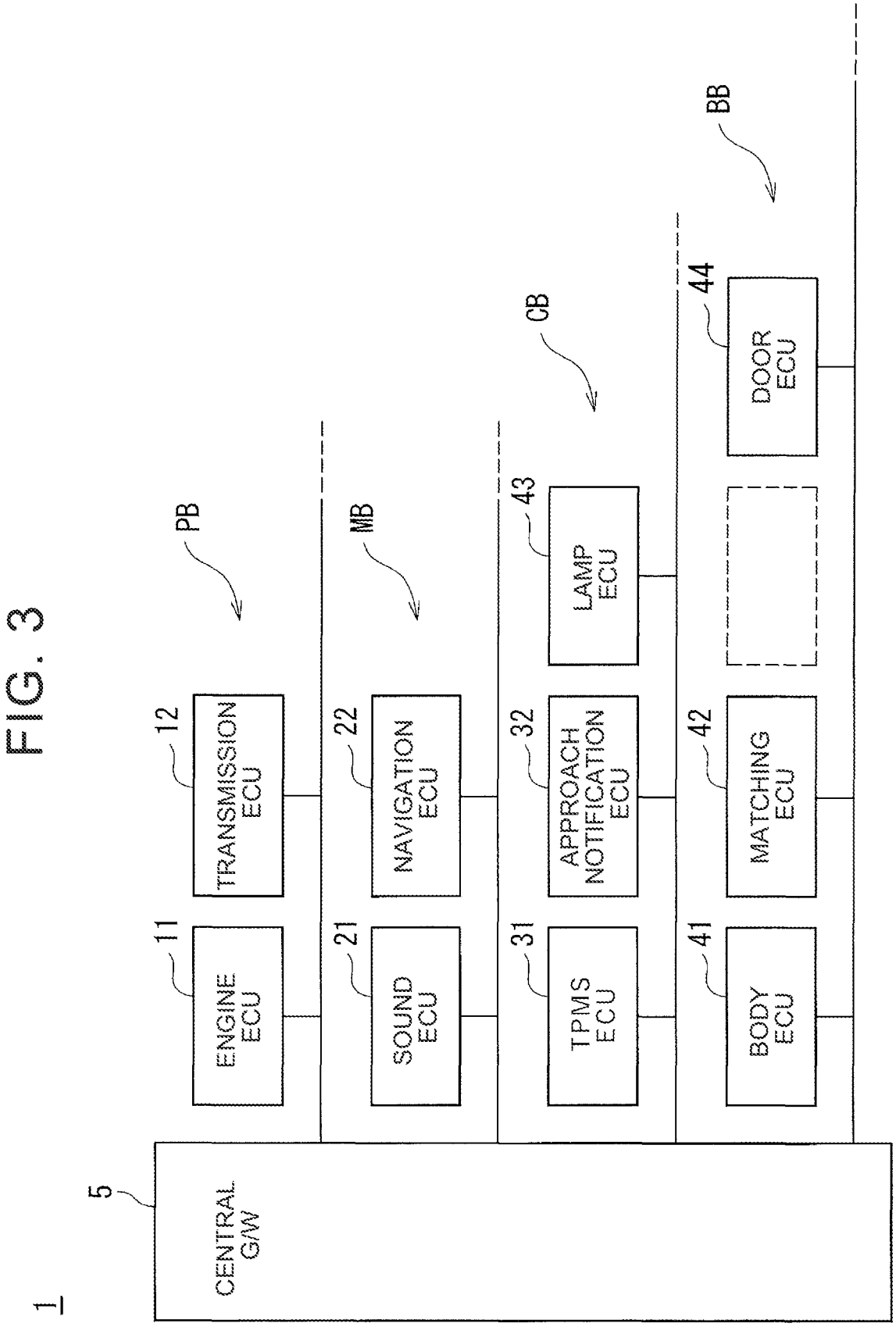
FIG. 3 is a diagram illustrating a schematic configuration of a construction in-vehicle network after the layout-changing of ECU is performed in the embodiment.

Then, in ST10, the construction in-vehicle network 1 is determined by changing the layout of the lamp ECU 43 on another bus. Specifically, the construction in-vehicle network 1 is determined by laying out the lamp ECU 43 on a bus that does not require information for the matching ECU 42 to deactivate the immobilizer (which does not receive the information from the central gateway 5). This ST10 corresponds to "a step of laying out the security risk ECU on another bus when the extracted security risk ECU is arranged on the same bus as ECU having no high security level at the arrangement positions of the respective ECU determined by the respective steps". FIG. 3 is a schematic configuration of the constructed in-vehicle network 1 determined in this manner, in which the lamp ECU 43 is laid out on the chassis bus CB. The broken line in FIG. 3 indicates the layout position of the lamp ECU 43 prior to the layout change. In order to change the layout of the lamp ECU 43 on the chassis bus CB in this manner, the layout may be changed such that the lamp ECU 43 is connected to the chassis bus CB by means of the arrangement of the electric wires while maintaining the arrangement position of the lamp ECU 43 on the vehicle body at the same position as the temporary vehicle-mounted network 1', or the layout may be changed such that the arrangement position of the lamp ECU43 on the vehicle body is changed to a position rearward of the temporary vehicle-mounted network 1' in the vehicle body (a position where it is difficult to be illegally accessed) and the lamp ECU43 is connected to the chassis bus CB by means of the arrangement of the electric wires.

Advantageous Effect of Embodiment

As described above, in the present embodiment, unauthorized access to an ECU having a low security level (matching ECU 42) from a connector connected to ECU (lamp ECU 43) can be suppressed by changing the layout of ECU having a security risk (lamp ECU 43) on another bus (chassis bus CB). Accordingly, it is possible to suppress theft of vehicles due to unauthorized access, and to construct ECU layouts capable of implementing robust security-measures.

Other Embodiments

It should be noted that the present disclosure is not limited to the above-described embodiment, and all modifications and applications included in the claims and the range equivalent to the claims can be applied.

For example, in the above-described embodiment, a ECU having a lower accessibility level is a lamp ECU 43, and a bus (a bus for which security measures are not taken) to which a lamp ECU 43 is connected in the temporary vehicle-mounted network 1' is used as a body bus BB. The present disclosure is not limited thereto. For example, an ECU having a lower accessibility level may be an approach notification ECU 32, and a bus (a bus for which security measures are not taken) to which an approach notification ECU 32 is connected in the temporary vehicle-mounted network 1' may be used as a chassis bus CB.

Further, in the above-described embodiment, the construction in-vehicle network 1 is configured by changing the layout of only one ECU (lamp ECU 43) among the plurality of ECUs 11 to 44. The present disclosure is not limited to this, and the construction in-vehicle network 1 may be configured by changing a layout of a plurality of ECU.

Further, as a method for implementing a robust security measure, a procedure opposite to the procedure in the above-described embodiment may be adopted, and the arrangement position of the connector may be determined after confirming the risk of unauthorized access. That is, after confirming the risk due to unauthorized access and determining the mounting position of each ECU and the division form of the electric wire, the arrangement position of the connector connecting the electronic component and the electric wire related thereto affected by unauthorized access may be determined as a position not affected by unauthorized access. In addition, security measures may be taken for ECU connected to the body bus BB (a bus that is not high in security level in the temporary vehicle-mounted network 1') and devices controlled by ECU (measures by security software are taken), or security may be ensured by updating security software for those that have been security measures taken.

The present disclosure is applicable to methods for determining ECU layouts for suppressing adverse effects caused by unauthorized access to an in-vehicle network.

What is claimed is:

1. A method of determining a layout of an electronic control unit (ECU) on an in-vehicle network in which a plurality of the ECUs is connected to each of a plurality of buses, the method comprising:

determining an arrangement position of each of the ECUs to be mounted on a vehicle using electric wires, the arrangement position being based on preferentially making a length of a first electric wire shorter than that of a second electric wire, and the first electric wire having a larger diameter than the second electric wire;

determining an electric wire dividing configuration and the number and positions of connectors for connecting the electric wires to each of the ECUs according to the determined arrangement position;

extracting, from among the ECUs, an ECU arranged at a position where a working time required for accessing from an outside of the vehicle is less than a predetermined time or a position where the number of working steps required for accessing from the outside of the vehicle is less than a predetermined number;

determining whether the extracted ECU is connected to a bus where no security software-based measures are taken in the determined arrangement position; and changing a bus to which the extracted ECU is connected to another bus in a case where a determination is made that the extracted ECU is connected to the bus where no security software-based measures are taken in the determined arrangement position.

2. The method according to claim 1, wherein the bus where no security software-based measures are taken is a body bus connected with a body ECU and a matching ECU, the matching ECU is configured to deactivate an immobilizer mounted on the vehicle in response to a command signal from the body ECU, and the bus to which the extracted ECU is connected is changed from the body bus to a chassis bus in which information to deactivate the immobilizer is not required.

3. The method according to claim 1, wherein the bus to which the extracted ECU is connected is changed to the other bus by changing an arrangement of the electric wires while maintaining the determined arrangement position of the extracted ECU.

4. The method according to claim 1, wherein the bus to which the extracted ECU is connected is changed to the other bus by changing an arrangement of the electric wires and changing a position of the extracted ECU to a position rearward of the in-vehicle network based on the determined arrangement position.

* * * * *